United States Patent Office 3,822,223
Patented July 2, 1974

3,822,223
PREPARING POLYURETHANES WITH A DIALKYL TIN CARBOXYLATE/TERTIARY AMINE CATALYST COMBINATION
Paul G. Gemeinhardt, Pittsburgh, Pa., and J. W. Britain, New Martinsville, W. Va., assignors to Baychem Corporation, New York, N.Y.
No Drawing. Continuation of application Ser. No. 627,626, Apr. 3, 1967, which is a continuation-in-part of application Ser. No. 575,899, Aug. 29, 1966, which is a continuation of application Ser. No. 193,857, May 10, 1962, which is a continuation of application Ser. No. 835,450, Aug. 24, 1959, all now abandoned, which in turn is a continuation-in-part of application Ser. No. 771,242, Nov. 3, 1958, now Patent No. 3,397,158. This application Jan. 6, 1971, Ser. No. 104,466
Int. Cl. C08g 22/34, 22/46
U.S. Cl. 260—2.5 AC    13 Claims

ABSTRACT OF THE DISCLOSURE

A polyurethane foam is prepared by a process in which a polyalkylene ether polyol is reacted with an organic polyisocyanate with a catalyst which combines an organo-tin compound with a tertiary amine.

This invention relates generally to the preparation of cellular and/or non-cellular polyurethane plastics and, more particularly, to an improved catalytic process for making such plastics. This application is a continuation of our copending application Ser. No. 627,626, filed Apr. 3, 1967, now abandoned; which application is a continuation-in-part of application Ser. No. 575,899, filed Aug. 29, 1966, now abandoned; which application is a continuation of application Ser. No. 193,857, filed May 10, 1962, now abandoned; which application is a continuation of application Ser. No. 835,450, filed Aug. 24, 1959, now abandoned; which application is a continuation-in-part of application Ser. No. 771,242, filed Nov. 3, 1958, now U.S. Pat. No. 3,397,158.

It has been proposed heretofore to prepare a cellular polyurethane plastic by reacting an organic polyisocyanate with water and a polyalkylene ether glycol or polyester of high molecular weight. Reaction of the polyisocyanate with reactive hydrogen atoms of the polyester or polyalkylene ether glycol produces urethane linkages with the formation of a high molecular weight polyurethane. Carbon dioxide and urea linkages are formed by the reaction between water and a polyisocyanate. This carbon dioxide becomes entrapped in the viscous reaction mixture where it remains until solidification. The resulting product has a cellular structure.

As set forth in our aforesaid copending applications, the reactions which result in the formation of the polyurethane can be catalyzed to advantage by including a catalyst composition containing tin in the reaction mixture. Several examples of suitable tin compounds are disclosed in those applications and these can all be used to advantage.

It is, therefore, an object of this invention to provide an improved process for making a polyurethane. Another object of the invention is to provide an improved catalyst system for making a polyurethane from a polyalkylene ether alcohol, polyester or the like. A more specific object of the invention is to provide an improved catalyst system for making a cellular polyurethane plastic. A more specific object of the invention is to provide a method for making polyurethane plastics and particularly cellular polyurethane plastics by a process which involves reacting a polyalkylene ether glycol or other polyol prepared by condensation of an alkylene oxide and an organic polyisocyanate together in which all components can be mixed together simultaneously. Still another object of the invention is to provide a method for making polyurethanes in which the reactants may be mixed together simultaneously or a prepolymer can be prepared in a separate step.

The foregoing objects and others are accomplished in accordance with this invention, generally speaking, by providing a method for making a polyurethane plastic wherein an organic compound containing groups containing active hydrogens, said groups being reactive with —NCO groups, and an organic polyisocyanate are reacted together while mixed with a catalytic amount of a catalyst system containing a tertiary amine and a tetravalent organo-tin compound having at least one carbon to tin bond, such as, for example, a dialkyl tin sulfide, a dialkyl tin dialkoxide, an alkyl tin trialkoxide, a dialkyl tin diphenate, an alkyl tin triphenate, a dialkyl tin dinaphthanate, an alkyl tin trinaphthanate, a trialkyl tin oxide, a dialkyl tin dichloride, a dialkyl tin oxide or a dialkyl tin salt of a carboxylic acid having from 1 to 18 carbon atoms and mixtures thereof.

The reaction mixture must contain water or a suitable blowing agent, such as, for example, a halogenated hydrocarbon, such as chlorodifluoromethane, methylene chloride, dichlorodifluoromethane, or other inert gas including air, carbon dioxide, nitrogen and those inert gases disclosed in French Pat. 1,161,239 published Aug. 25, 1958 and granted to Goodyear Tire and Rubber Company if the product is to have a cellular structure. The invention is most advantageous in the preparation of a foam or cellular polyurethane when water is used to form carbon dioxide by reaction with an organic polyisocyanate and when the reaction mixture also contains a stabilizer containing an organo-silicon compound, such as, for example, a siloxane oxyalkylene block copolymer or the like. The invention thus contemplates in its broadest aspects the preparation of a cellular polyurethane plastic from any organic compound having a molecular weight of at least about 200 and at least two hydrogen atoms determinable by the Zerewitinoff method and an organic polyisocyanate and water or other material which will serve as a blowing agent and result in the formation of a cellular product in the presence of the novel catalyst system, but the preferred embodiment of the invention contemplates the preparation of a cellular product from such a reaction mixture also containing a suitable organo-silicon compound as a stabilizer.

In preparing a substantially nonporous rubber-like polyurethane plastic in accordance with this invention, an organic compound containing at least two groups each containing an hydrogen atom reactive with an —NCO group or, in other words, an organic compound having at least two groups containing an hydrogen atom determinable by the Zerewitinoff method and having a molecular weight of at least about 200 and an organic polyisocyanate are reacted together while mixed with a catalytic amount of a tertiary amine and one of the novel tin compounds described hereinbefore as contemplated by the invention. Preferably, the reaction mixture should be substantially anhydrous and the reaction should be conducted under substantially anhydrous conditions in order to avoid the formation of bubbles in the product. The resulting adduct having —NCO groups can be reacted further with a suitable chain extender or cross-linker, such as, for example, water or an organic compound containing hydrogen atoms determinable by the Zerewitinoff method and having a molecular weight of less than about 500. Examples of suitable organic chain extenders include the polyhydric alcohols, such as ethylene glycol, diethylene glycol, 1,3-butane diol, glycerol, trimethylol propane, the amino alcohols such as, ethanolamine, the polyamines such as ethylene diamine or the like.

The manipulative steps involved for making a rubber-like substantially nonporous polyurethane plastic from polyesters and organic polyisocyanates are disclosed in U.S. Pats. 2,621,166; 2,729,618 and 2,778,810. Similar operative steps can be used when preparing the polyurethane from a polyhydric polyalkylene ether.

A substantially nonporous rubber-like polyurethane may be prepared either by mixing the reactants together and casting the mixture as it solidifies or by preparing a millable gum and molding the millable gum as the product is chain extended or cross-linked. In the casting process, the organic compound containing groups containing hydrogen atoms reactive with an —NCO group and an organic diisocyanate are reacted together in the presence of the novel catalyst to form an adduct having terminal —NCO groups which is chain-extended in a second step by reaction with a chain extender such as one of those mentioned above. An excess of organic diisocyanate over that theoretically required to react with all of the reactive hydrogen atoms of the polyalkylene ether alcohol, polyester or the like is used. Slightly less than enough chain extender is used to react with all of the —NCO groups of the adduct. Preferably, the total amount of polyisocyanate used will provide about 1.05 to about 1.1 —NCO groups per reactive hydrogen provided by the organic compound having a molecular weight of at least about 200 plus the reactive hydrogens of the chain extender or cross-linker.

In the millable gum process, the amount of polyisocyanate used is preferably from about 0.7 to about 0.9 —NCO group per reactive hydrogen of the organic compound containing groups containing hydrogen atoms reactive with an —NCO group and chain extender. The millable gum obtained by mixing these ingredients and the novel catalyst on a rubber mill is cured by adding more polyisocyanate to bring the over-all ratio of —NCO to reactive hydrogen atoms to from about 1 to about 1.1 —NCO groups per reactive hydrogen atom.

In preparing a cellular polyurethane, preferably from about 0.9 to about 1.5 —NCO groups are provided for each hydrogen atom supplied by the organic compound containing reactive hydrogens and water.

A substantially nonporous polyurethane may also be prepared without using a chain extender. In such a process, the novel catalyst and organic compound having reactive hydrogens are mixed under substantially anhydrous conditions with organic polyisocyanate in an amount to provide about 1.05 to about 1.1 —NCO groups per hydroxyl groups and the resulting mixture may be shaped as it solidifies.

Any suitable dialkyl tin sulfide in which the alkyl groups contain from 1 carbon atom to 18 carbon atoms, such as, for example, dimethyl tin sulfide, diethyl tin sulfide, methyl ethyl tin sulfide, dipropyl tin sulfide, methyl propyl tin sulfide, diisopropyl tin sulfide, dibutyl tin sulfide, ethyl butyl tin sulfide, dioctyl tin sulfide, methyl octyl tin sulfide, diheptyl tin sulfide, dihexadecyl tin sulfide, dioctadecyl tin sulfide or the like may be used. Any suitable dialkyl tin dialkoxide or alkyl tin trialkoxide in which the alkyl groups and the alkoxide groups contain from 1 to 18 carbon atoms may be used, such as, for example, dimethyl tin dimethoxide, dimethyl tin diethoxide, dibutyl tin dibutoxide, dimethyl tin dibutoxide, ethyl tin tributoxide, heptadecyl tin tributoxide, octadecyl tin trimethoxide, amyl tin triethoxide, or the like. Any suitable dialkyl tin diphenate, dialkyl tin dinaphthanate, alkyl tin triphenate or alkyl tin trinaphthanate in which the alkyl groups have from 1 to 18 carbon atoms may be used. The benzene or naphthalene ring may be substituted with an alkyl group, a cycloaliphatic ring, a halogen or nitro group. Examples of such compounds include dibutyl tin bis-o-phenyl phenate, dimethyl tin bis-o-phenyl phenate, diethyl tin bis-o-phenyl phenate, diamyl tin bis-o-naphthyl naphthanate, butyl tin tri-o-naphthyl naphthanate, butyl tin tri-o-phenyl phenate, dicyclohexyl tin bis-o-phenyl phenate or the like.

As indicated hereinbefore, the catalyst provided by this invention may be any suitable dialkyl tin salt of a carboxylic acid having from 1 to 18 carbon atoms but best results are obtained if the acid contains from 1 to 8 carbon atoms. The two alkyl groups may be alike or different. The alkyl groups may contain from 1 to 18 carbon atoms. Examples of such compounds include dibutyl tin diacetate, dibutyl tin diformate, dimethyl tin adipate, dibutyl tin maleate, dipropyl tin diacetate, diethyl tin diformate, dipropyl tin dioleate, dipropyl tin dipropionate, diamyl tin dipropionate, dioctyl tin diacetate and the like. Likewise, any suitable trialkyl tin oxide, dialkyl tin oxide or dialkyl tin dichloride may be used. The alkyl groups on these compounds may contain from 1 to 18 carbon atoms. Examples of such compounds include tributyl tin oxide, trioctyl tin oxide, dibutyl tin oxide, dipropyl tin oxide, dibutyl tin dichloride, dipropyl tin dichloride, dioctyl tin dichloride and the like. The trialkyl tin oxides are more accurately called bis(trialkyl tin) oxides. The tin compound used as a catalyst in accordance with this invention must be soluble in the quantity used in at least one of the reactants used to make the polyurethane plastic. Preferably, the tin compound should be soluble in the condensation product of the alkylene oxide.

In its broadest aspects, the invention contemplates the preparation of a polyurethane by a process in which one of the organo-tin compounds set forth herein or a mixture thereof is used in admixture with any tertiary amine in a catalytic amount. Any and all catalytic amounts of the mixed catalyst are contemplated. For best results, the reaction mixture should contain from about .01 to about 3 parts by weight, preferably 0.01 to 0.1 part, of the organo-tin catalyst compound per 100 parts of organic compound containing groups containing hydrogen atoms reactive with an —NCO group. The reaction mixture should contain from about 0.1 to about 3 parts by weight and preferably about 0.1 to about 2 parts by weight tertiary amine catalyst, such as, for example, triethylene diamine, N,N,N',N'-tetramethyl butylene diamine, N-ethyl morpholine, N-methyl morpholine, pyridine, diethyl ethanol amine, or other suitable tertiary amines for best results. In most instances, the amount of tin compound in the catalyst combination can be limited to from about 0.1 part to about 0.5 part per 100 parts of organic compound containing groups containing hydrogen atoms reactive with an —NCO group.

Although the process provided by this invention is applicable to the preparation of polyurethanes from any suitable organic compound containing groups containing hydrogen atoms reactive with an —NCO group, or in other words, containing hydrogen atoms determinable by the Zerewitinoff method such as, for example, a polyester prepared by esterification of a polyhydric alcohol and a polycarboxylic acid, a polythioether glycol, a polyacetal, a polyester amide, the copolymer of carbon monoxide and an olefin or the like, it has been found that the catalyst is most advantageous in the preparation of a polyurethane from a polyhydric polyalkylene ether and particularly from a polyhydric polyalkylene ether having a molecular weight of at least about 200 and a secondary hydroxyl group such as, for example, a polyhydric polypropylene ether. Suitable compounds of these types are disclosed in U.S. Reissure Pat. 24,514, the disclosure of which is incorporated herein by reference. Polyesters which may be used in the process provided by this invention include the polyesters having a molecular weight of at least about 200 prepared by esterification of adipic acid, succinic acid, succinic anhydride, maleic acid or the like with a polyhydric alcohol such as, for example, ethylene glycol, diethylene glycol, trimethylol propane, glycerine, hexane triol, pentaerythritol and the like. The polyester amide may be formed from a similar polycarboxylic acid and from a suitable amino alcohol such as ethanol amine, triethanol amine and the like. The polythioether glycol or other polythioether alcohol may be prepared by condensation of a thioether alcohol such as dithioglycol and the like or by the condensation of a thioether alcohol with a glycol such as ethylene glycol or other polyhydric alcohol such as glycerine, trimethylol propane, pentaerythritol and the like. The polyalkylene ether alcohol preferably has from 2 to 4 hydroxyl groups and a molecular weight of at least about 200 and is prepared by condensation of a suitable alkylene oxide such as, for example, a lower alkylene oxide including ethylene oxide, propylene oxide, butylene oxide, amylene oxide or the like, or by condensation of one or more of these oxides with a polyhydric alcohol such as, for example, ethylene glycol, glycerine, trimethylol propane, pentaerythritol or the like. These high molecular weight polyalkylene ether glycols may be prepared by any known method such as, for example, the method described in the "*Encyclopedia of Chemical Technology*," volume 7, pages 257 through 262 published by Interscience Publishers, Inc., in 1951 and in U.S. Pat. 1,922,459. Preferably, the acid number of the polyester should not exceed 30 and most preferably should be less than 5. The hydroxyl number of the organic compound containing active hydrogens preferably should be less than about 500.

Any suitable organic polyisocyanate, including those disclosed in U.S. Reissue Pat. 24,514 may be used but it is preferred to use an arylene diisocyanate such as, for example, 2,4-tolylene diisocyanate, 2,6-tolylene diisocyanate p,p′-diphenyl methane diisocyanate, 1,5-naphthalene diisocyanate, or the like. Suitable triisocyanates include 4,4′, 4″-triphenyl methane triisocyanate. Mixtures of the foregoing isocyanates such as, or example, an isomeric mixture of 20 percent 2,6-tolylene diisocyanate and 80 percent 2,4-tolylene diisocyanate may be used. Suitable emulsifiers such as, for example, those disclosed in U.S. Reissue Pat. 24,514 or others known to the art may be used, if desired.

Of the various tin compounds disclosed as suitable herein, dibutyl tin di(2-ethyl)hexoate, dibutyl tin diacetate, dibutyltindibutoxide, dibutyltinsulfide, and dibutyltin bis-o-phenyl phenate have given best results so far so these compounds are preferred.

In addition to those tertiary amines mentioned hereinbefore, a piperazine compound such as, for example, 1-methyl-4 dimethyl amino ethyl piperazine, 1-ethyl-4 diethyl amino ethyl piperazine, 1-butyl-4 dipropyl amino propyl piperazine or the like may be used. Particularly good results have been obtained with a mixture of one of the organo-tin compounds specified herein along with triethylene diamine and N-ethyl morpholine. N-methyl morpholine or other N-lower alkyl morpholine may also be used in this mixture.

As suggested hereinbefore, it has been found that the reaction components of a cellular polyurethane plastic including a polyalkylene ether glycol as the major component supplying hydroxyl groups may all be mixed together substantially simultaneously providing one of the catalysts specified hereinbefore is used. Preferably, a silicone having the hereinafter described formula is included in the formulation as a stabilizer in a one-shot method. The invention thus contemplates a so-called "one-shot" method for making cellular polyurethane plastics from a polyalkylene ether glycol and similar compounds prepared by condensation of an alkylene oxide which process is made possible by the use of one of the novel catalysts and, preferably, the concurrent use of a compound of the above description as a stabilizer.

The cellular polyurethanes provided by this invention are particularly well-suited for use as cushions or as upholstery in furniture. The non-cellular polyurethanes provided by this invention are useful as coatings for textiles, metal and the like, potting compounds, and for molding machine parts including bearings, vehicle tires and the like.

Although the process provided by this invention using one of the catalysts containing one of the specified tin compounds is most advantageous because it permits the mixing of all of the ingredients together simultaneously, it is possible to prepare a polyurethane plastic using one of the catalysts disclosed herein in accordance with a two-step process. In the two-step process, the polyol prepared by condensing compounds including an alkylene oxide is reacted with an excess of an organic polyisocyanate to form an adduct or prepolymer having terminal —NCO groups. This prepolymer is then reacted with water in a second step to form the cellular polyurethane. When using the catalyst in this type of process, it is mixed with the prepolymer and the water in the second step of the process. The amount of isocyanate, catalyst and water used in the two-step process is essentially the same as that used when a "one-shot" method is employed.

The catalyst system provided by this invention enables better control over the reactions which produce the polyurethane, particularly when making a cellular product. The tin compounds appear to have the most catalytic effect on the reaction between the polyalkylene ether alcohol and polyisocyanate while the tertiary amines affect the reaction of —NCO groups with water. By varying the amount of each catalyst, the properties of the cellular product, rise time of the reaction mixture as it foams and various other things can be predetermined with greater accuracy than with heretofore available catalyst systems.

The invention is further illustrated but is not intended to be limited by the following examples in which all parts and percentages are by weight unless otherwise specified.

EXAMPLE 1

About 100 parts by weight of a polypropylene ether triol prepared by condensation of propylene oxide and glycerine and having a molecular weight of about 3,000 and an hydroxyl number of about 56, about 38 parts by weight of a mixture of 80 percent 2,4-tolylene diisocyanate and 20 percent 2,6-tolylene diisocyanate, about 4.5 parts by weight of an activator mixture containing about 0.2 part dibutyltinsulfide, 0.1 part cyclic triethylene diamine 0.2 part N-ethyl morpholine, about 3 parts water and about 1 part of an oxyalkylene block copolymer having the formula

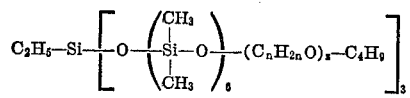

wherein ($C_nH_{2n}O$) represents about 17 oxyethylene units and about 13 oxypropylene units and the value of $z$ is thus about 30, are mixed together substantially simultaneously with an apparatus of the type disclosed in U.S. Reissue Pat. 24,514. The diisocyanat and activator mixture are injected into a stream of the polyalkylene ether glycol in the apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular mixture solidifies into a cellular polyurethane having a density of about 2 pounds per cubic foot.

EXAMPLE 2

About 100 parts by weight polypropylene ether alcohol having three hydroxyl groups prepared by condensation of propylene oxide and glycerine and having a molecular weight of about 3,000 and an hydroxyl number of about 56, about 38 parts by weight of a mixture of 80 percent 2,4-tolylene diisocyanate and 20 percent 2,6-tolylene diisocyanate, about 4.5 parts by weight of an activator mixture containing about 0.2 part dibutyltinbutoxide, about 0.1 part triethylene diamine, 0.2 part N-ethyl morpholine, about 3 parts water and about 1 part of an oxyalkylene block copolymer having the formula

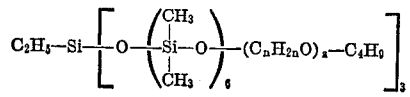

wherein ($C_nH_{2n}O$) represents about 17 oxyethylene units and about 13 oxypropylene units and the value of $z$ is thus about 30, are mixed together substantially simultaneously with an apparatus of the type disclosed in U.S. Reissue Pat. 24,514. The diisocyanat and activator mixture are injected into a stream of the polyalkylene ether glycol in the apparatus and mixing of the components is achieved substantially instantaneously. The resulting mixture is discharged from the apparatus and chemical reaction occurs almost instantaneously with the reaction mixture beginning to foam and expand. After chemical reaction has a subsided, the expanded cellular mixture solidifies into a cellular polyurethane having a density of about 2 pounds per cubic foot.

EXAMPLE 3

About 100 parts by weight of polypropylene ether triol prepared by condensation of propylene oxide and glycerine and having a molecular weight of about 3,000 and an hydroxyl number of about 56, about 38 parts by weight of a mixture of 80 percent, 2,4-tolylene diisocyanate and 20 percent 2,6-tolylene diisocyanate, about 4.5 parts by weight of an activator mixture containing about 0.2 part dibutyl thin bis-o-phenyl phenate, 0.1 part triethylene diamine, 0.2 part N-methyl morpholine, about 3 parts water and about 1 part of an oxyalkylene block copolymer having the formula

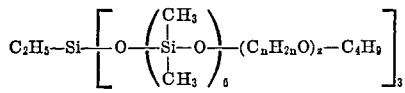

wherein ($C_nH_{2n}O$) represents about 17 oxyethylene units and about 13 oxypropylene units and the value of $z$ is thus about 30, are mixed together substantially simultaneously with an apparatus of the type disclosed in U.S. Reissue Pat. 24,514. The diisocyanat and activator mixture are injected into a stream of the polyalkylene ether glycol in the apparatus and mixing of the components is achieved substantially instantaneously. The resulting mixture is discharged from the apparatus and chemical reaction occurs almost instantaneously with the reaction mixture beginning to foam and expand. After chemical reaction has a subsided, the expanded cellular mixture solidifies into a cellular polyurethane having a density of about 2 pounds per cubic foot.

EXAMPLE 4

About 100 parts by weight polypropylene ether glycol prepared by condensation of propylene oxide and having an average molecular weight of about 2,000 and an hydroxyl number of about 56, about 38 parts by weight of a mixture of 80 percent 2,4-tolylene diisocyanate and 20 percent 2,6-tolylene diisocyanate, about 5 parts of an activator containing about 0.2 part dibutyl tin sulfide, about 0.1 part cyclic triethylene diamine and about 0.2 part N-ethyl morpholine, about 3 parts water and about 1.5 part of a compound having the formula

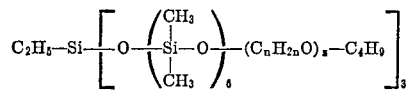

wherein ($C_nH_{2n}O$) represents about 17 oxyethylene units and about 13 oxypropylene units and the value of $z$ is thus about 30, are mixed together substantially simultaneously with an apparatus of the type disclosed in U.S. Reissue Pat. 24,514. The diisocyanate and activator mixture are injected into a stream of the polyalkylene ether glycol in the apparatus and mixing of the components is achieved substantially instantaneously. The resulting mixture is discharged from the apparatus and chemical reaction occurs almost instantaneously with the reaction mixture beginning to foam and expand. After chemical reaction has a subsided, the expanded cellular mixture solidifies into a cellular polyurethane having a density of about 2 pounds per cubic foot.

EXAMPLE 5

About 100 parts by weight polypropylene ether glycol prepared by condensation of propylene oxide and having an average molecular weight of about 2,000 and an hydroxyl number of about 56, about 35 parts of a mixture of 80 percent 2,4-tolylene diisocyanate and 20 percent 2,6-tolylene diisocyanate, about 4.5 parts of an activator containing about 0.2 part dibutylytin-dibutoxide about 0.1 part triethylene diamine and about 0.2 part N-ethyl morpholine, about 2.5 parts water and about 1.5 parts of a compound having the formula

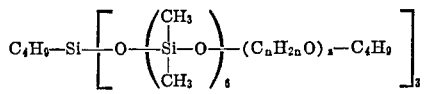

wherein ($C_nH_{2n}O$) represents about 15 oxyethylene units and about 15 oxypropylene units, are mixed together substantially simultaneously with an apparatus of the type disclosed in U.S. Reissue Pat. 24,514. The diisocyanate and activator mixture are injected into a stream of the polypropylene ether glycol in this apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular mixture solidifies into a cellular polyurethane having a density of about 2.5 pounds per cubic foot.

EXAMPLE 6

About 100 parts by weight polypropylene ether glycol prepared by condensation of propylene oxide having an average molecular weight of about 1,000, an hydroxyl number of about 112, and about 30 parts by weight trimethylol propane are mixed with about 175 parts by weight of a mixture of 65 percent 2,4-tolylene disocyanate and 35 percent 2,6-tolylene diisocyanate, about 4.5 parts of an activator mixture containing about 0.2 part dicyclohexyltinsulfide, about 0.1 part triethylene diamine, about 0.2 part N-ethyl morpholine, about 3 parts water and about 1 part of a compound having the formula

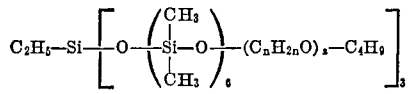

wherein ($C_nH_{2n}O$) represents about 17 oxyethylene units and about 13 oxypropylene units and the value of $z$ is thus about 30, are mixed together substantially simultaneously with an apparatus of the type disclosed in U.S. Reissue Pat. 24,514. The diisocyanate and activator mixture are injected into a stream of the polyalkylene ether glycol in the apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular mixture solidifies into a cellular polyurethane having a density of about 2 pounds per cubic foot.

EXAMPLE 7

About 100 parts by weight of a polyester having an acid number of about 1, an hydroxyl number of about 55 and a molecular weight of about 2,000 prepared by esterification of adipic acid and ethylene glycol are mixed with about 42 parts 2,4-tolylene diisocyanate, about 0.2 part dibutyltindibutoxide, about 0.1 part triethylene diamine and about 0.2 part N-ethyl morpholine, about 3.2 parts water and about 3 parts sulfonated castor oil in an apparatus of the type disclosed in U.S. Reissue Pat. 24,514. The resulting mixture is discharged from the apparatus and chemical reaction with expansion and foaming of the mixture begins immediately. The resulting cellular polyurethane has a density of about 2.0 pounds per cubic foot.

EXAMPLE 8

About 100 parts by weight polypropylene ether glycol prepared by condensation of propylene oxide and having an average molecular weight of about 2,000 and an hydroxyl number of about 56, about 38 parts by weight of a mixture of 80 percent 2,4-tolylene diisocyanate and 20 percent 2,6-tolylene diisocyanate, about 5 parts of an activator containing about 0.2 part dibutyltin bis-o-phenyl phenate and about 0.3 part 1-methyl-4-dimethyl amino ethyl piperazine, about 3 parts water and about 1.5 parts of a compound having the formula

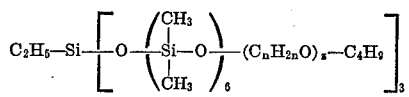

wherein ($C_nH_{2n}O$) represents about 17 oxyethylene units and about 13 oxypropylene units and the value of $z$ is thus about 30, are mixed together substantially simultaneously with an apparatus of the type disclosed in U.S. Reissue Pat. 24,514. The diisocyanate and activator mixture are injected into a stream of the polyalkylene ether glycol in the apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular material solidifies into a cellular polyurethane having a density of about 2 pounds per cubic foot.

EXAMPLE 9

About 100 parts by weight of a polypropylene ether triol prepared by condensation of propylene oxide and glycerine and having a molecular weight of about 3,000 and an hydroxyl number of about 56, about 38 parts by weight of a mixture of 80 percent 2,4-tolylene diisocyanate and 20 percent 2,6-tolylene diisocyanate, about 4.5 parts by weight of an activator mixture containing about 0.2 part dimethyltinsulfide, 0.1 part cyclic triethylene diamine, 0.2 part N-ethyl morpholine, about 3 parts water and about 1 part of an oxyalkylene block copolymer having the formula

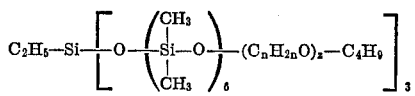

wherein ($C_nH_{2n}O$) represents about 17 oxyethylene units and about 13 oxypropylene units and the value of $z$ is thus about 30 are mixed together substantially simultaneously with an apparatus of the type disclosed in U.S. Reissue Pat. 24,514. The diisocyanate and activator mixture are injected into a stream of the polyalkylene ether glycol in the apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular mixture solidifies into a cellular polyurethane having a density of about 2 pounds per cubic foot.

EXAMPLE 10

About 100 parts by weight of a polythioether glycol having an hydroxyl number of about 56 and a molecular weight of about 2,000 prepared by condensation of di-thioglycol are mixed with about 38 parts 2,4-tolylene diisocyanate, about 0.2 part dibutyltindibutoxide, about 0.2 part N-ethyl morpholine and about 0.1 part cyclic triethylene diamine, about 2.9 parts water and about 1.0 part of an oxyalkylene block copolymer having the formula

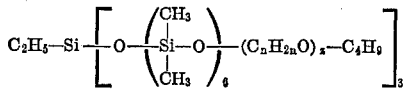

wherein ($C_nH_{2n}O$) represents about 17 oxyethylene units, about 13 polypropylene units and the value of $z$ is thus about 30, are mixed together substantially simultaneously with an apparatus of the type disclosed in U.S. Reissue Pat. 24,514. The resulting mixture is discharged from the apparatus and chemical reaction with expansion and foaming of the mixture takes place immediately. The resulting cellular polyurethane has a density of about 2.0 pounds per cubic foot.

EXAMPLE 11

About 100 parts by weight of a triol prepared by condensation of propylene oxide and glycerine and having a molecular weight of about 3,000 and an hydroxyl number of about 56, about 0.2 part of dibutyl tin sulfide, about 0.2 part N-ethyl morpholine and about 0.1 part triethylene diamine and about 9 parts of a mixture containing about 80 percent 2,4-tolylene diisocyanate and about 20 percent 2,6-tolylene diisocyanate are all simultaneously mixed together substantially instantaneously. The resulting mixture reacts to form a solid nonporous elastic polyurethane. The mixture may be put into a mold, spread as a sheet, coated with a brush, sprayed as a coating or used in many other ways before the mixture solidifies to a solid elastic nonporous polyurethane.

EXAMPLE 12

About 100 parts by weight of a triol prepared by condensation of propylene oxide and glycerine and having a molecular weight of about 3,000, about 0.2 part of dibutyl tin dibutoxide, about 0.1 part triethylene diamine and about 0.2 part N-ethyl morpholine and about 9 parts of a mixture containing about 80 percent 2,4-tolylene diisocyanate and about 20 percent 2,6-tolylene diisocyanate are all simultaneously mixed together substantially instantaneously. The resulting mixture reacts to form a solid nonporous elastic polyurethane. The mixture may be put into a mold, spread as a sheet, coated with a brush, sprayed as a coating, or used in many other ways before the mixture solidifies to a solid elastic nonporous polyurethane.

EXAMPLE 13

About 100 parts by weight of a triol prepared by condensation of propylene oxide and trimethylol propane and having a molecular weight of about 3,000, about 0.2 part of dicyclohexyltinsulfide, about 0.2 part N-ethyl morpholine and about 0.1 part triethylene diamine and about 9 parts of a mixture containing about 80 percent 2,4-tolylene diisocyanate and about 20 percent 2,6-tolylene diisocyanate are all simultaneously mixed together substantially instantaneously. The resulting mixture reacts to form a solid nonporous elastic polyurethane. The mixture may be put into a mold, spread as a sheet, coated with a brush, sprayed as a coating, or used in many other ways before the mixture solidifies into a solid elastic nonporous polyurethane.

EXAMPLE 14

About 100 parts by weight of a triol prepared by condensation of propylene oxide and glycerine and having a molecular weight of about 3,000, about 5.5 parts of an activator mixture containing about 1 part dibutyl-tin-di(2-ethylhexoate), about 3 parts water and about 1.5 parts of a compound having the formula

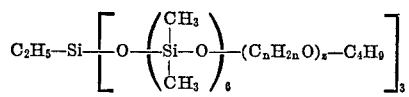

wherein ($C_nH_{2n}O$) represents about 17 oxyethylene units and about 13 oxypropylene units and the value of $z$ is thus about 30, and about 39.2 parts of a mixture containing about 80 percent 2,4-tolylene diisocyanate and about 20 percent 2,6-tolylene diisocyanate are all simultaneously mixed together substantially instantaneously. The resulting mixture reacts to form a cellular polyurethane having a density of about 2 pounds per cubic foot.

EXAMPLE 15

About 100 parts by weight polypropylene ether glycol having an average molecular weight of about 2,000 and an hydroxyl number of about 56, about 35 parts of a mixture of 80 percent 2,4-tolylene diisocyanate and 20 percent 2,6-tolylene diisocyanate, about 4.8 parts of an activator containing about 0.2 parts triethylene diamine and about 0.1 part dibutyl-tin-di(2-ethylhexoate), about 2.5 parts water and about 1.5 parts of a compound having the formula

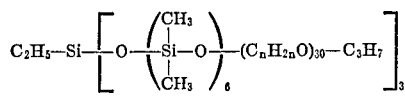

wherein $(C_nH_{2n}O)$ represents about 15 oxyethylene units and about 15 oxypropylene units, are mixed together substantially simultaneously with an apparatus of the type disclosed in U.S. Reissue Pat. 24,514. The diisocyanate and activator mixture are injected into a stream of the polyalkylene ether glycol in this apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular mixture solidifies into a cellular polyurethane having a density of about 2.5 pounds per cubic foot.

EXAMPLE 16

About 100 parts by weight polypropylene ether glycol having an average molecular weight of about 2,000 and an hydroxyl number of about 56, about 38 parts of a mixture of 80 percent 2,4-tolylene diisocyanate and 20 percent 2,6-tolylene dissocyanate, about 5 parts of an activator containing about 0.1 part dibutyl-tin-di(2-ethylhexoate), about 0.4 part 1-methyl-4-dimethylamino ethyl piperazine, about 3.0 parts water and about 1.5 parts of a compound having the formula

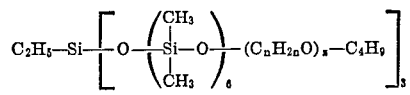

wherein $(C_nH_{2n}O)$ represents about 17 oxyethylene units and about 12 oxypropylene units and the value of $z$ is thus about 30, are mixed together substantially simultaneously with an apparatus of the type disclosed in U.S. Reissue Pat. 24,514. The diisocyanate and activator mixture are injected into a stream of the polyalkylene ether glycol in this apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular mixture solidifies into a cellular polyurethane having a density of about 2 pounds per cubic foot.

EXAMPLE 17

About 100 parts by weight polypropylene ether glycol having an average molecular weight of about 2,000 and an hydroxyl number of about 56, about 38 parts of a mixture of 80 percent 2,4-tolylene diisocyanate and 20 percent 2,6-tolylene diisocyanate, about 5 parts of an activator mixture containing about 0.1 part dibutyl-tin-di(2-ethylhexoate) about 0.2 part tetramethyl butylene diamine, about 3.0 parts water and about 1.5 parts of a compound having the formula

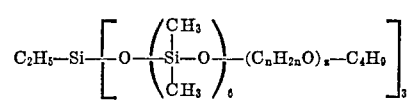

wherein $(C_nH_{2n}O)$ represents about 17 oxyethylene units and about 13 oxypropylene units and the value of $z$ is thus about 30, are mixed together substantially simultaneously with an apparatus of the type disclosed in U.S. Reissue Pat. 24,514. The diisocyanate and activator mixture are injected into a stream of the polyalkylene ether glycol in this apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular mixture solidifies into a cellular polyurethane having a density of about 2 pounds per cubic foot.

EXAMPLE 18

About 100 parts by weight of the polypropylene ether triol of Example 14, about 39.2 parts of a mixture of 80 percent 2,4-tolylene diisocyanate and 20 percent 2,6-tolylene diisocyanate, an activator containing about 0.2 dibutyl-tin-di(ethylhexoate), about 0.4 part 1 methyl-4-dimethyl-amino ethyl piperazine, about 3 parts water and about 1.5 parts of a compound having the formula

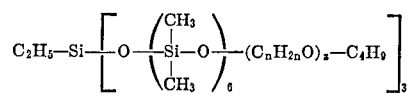

wherein $(C_nH_{2n}O)$ represents about 17 oxyethylene units and about 13 oxypropylene units and the value of $z$ is thus about 30, are mixed together substantially simultaneously with an apparatus of the type disclosed in U.S. Reissue Pat. 24,514. The diisocyanate and activator mixture are injected into a stream of the polyalkylene ether triol in this apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular mixture solidifies into a cellular polyurethane having a density of about 2 pounds per cubic foot.

EXAMPLE 19

About 100 parts by weight of the polypropylene ether triol of Example 14, about 39.2 parts of a mixture of 80 percent 2,4-tolylene diisocyanate and 20 percent 2,6-tolylene diisocyanate, an activator containing about 0.2 part dibutyl-tin-di(ethylhexoate), about 3 parts water and about 1.5 parts of a compound having the formula

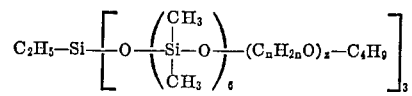

wherein $(C_nH_{2n}O)$ represents about 17 oxyethylene units and about 13 oxypropylene units and the value of $z$ is thus about 30, are mixed together substantially simultaneously with an apparatus of the type disclosed in U.S. Reissue Pat. 24,514. The diisocyanate and activator mixture are injected into a stream of the polyalkylene ether triol in this apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular mixture solidifies into a cellular polyurethane having a density of about 2 pounds per cubic foot.

EXAMPLE 20

About 100 parts by weight of the polypropylene ether triol of Example 14, about 39.2 parts of a mixture of 80 percent 2,4-tolylene diisocyanate and 20 percent 2,6-tolylene diioscyanate, an activator containing about 0.3 part triethylene diamine, about 3 parts water and about 1.5 parts of a compound having the formula

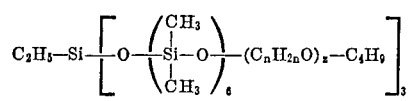

wherein ($C_nH_{2n}O$) represents about 17 oxyethylene units and about 13 oxypropylene units and the value of $z$ is thus about 30, are mixed together substantially simultaneously with an apparatus of the type disclosed in U.S. Reissue Pat. 24,514. The diisocyanate and activator mixture are injected into a stream of the polyalkylene ether triol in this apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular mixture solidifies into a cellular polyurethane having a density of about 2 pounds per cubic foot.

EXAMPLE 21

About 100 parts by weight of the polypropylene ether triol of Example 14, about 39.2 parts of a mixture of 80 percent 2,4-tolylene diisocyanate and 20 percent 2,6-tolylene diisocyanate, an activator containing bout 0.2 part dibutyl-tin-di(ethylhexoate) and 0.1 part triethylene diamine, about 3 parts water and about 1.5 parts of a compound having the formula

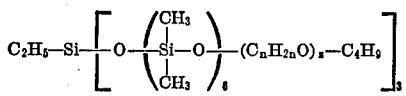

wherein ($C_nH_{2n}O$) represents about 17 oxyethylene units and about 13 oxypropylene units and the value of $z$ is thus about 30, are mixed together substantially simultaneously with an apparatus of the type disclosed in U.S. Reissue Pat. 24,514. The diisocyanate and activator mixture are injected into a stream of the polyalkylene ether triol in this apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular mixture solidifies into a cellular polyurethane having a density of about 2 pounds per cubic foot.

EXAMPLE 22

About 100 parts by weight of the polypropylene ether triol of Example 14, about 39.2 parts of a mixture of 80 percent 2,4-tolylene diisocyanate and 20 percent 2,6-tolylene diisocyanate, an activator containing about 7.2 parts 1-methyl-4-dimethyl-amino ethyl piperazine, about 3 parts water and about 1.5 parts of a compound having the formula

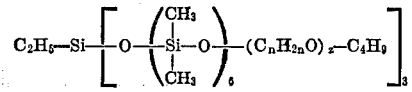

wherein ($C_nH_{2n}O$) represents about 17 oxyethylene units and about 13 oxypropylene units and the value of $z$ is thus about 30, are mixed together substantially simultaneously with an apparatus of the type disclosed in U.S. Reissue Pat. 24,514. The diisocyanate and activator mixture are injected into a stream of the polyalkylene ether triol in this apparatus and mixing of the components is achieved substantially instantaneously. The resulting mixture is discharged from the apparatus and chemical reaction occurs almost instantaneously with the reaction mixture beginning to foam and expand. After chemical reaction has subsided, the expanded cellular mixture solidifies into a cellular polyurethane having a density of about 2 pounds per cubic foot.

EXAMPLE 23

About 1.0 g. of dibutyl-tin-di(ethylhexoate) was dissolved in about 9.0 g. of dioxan. About 100 g. of the triol of Example 14 was added to the dioxan mixture and thoroughly stirred to dissolve the dibutyl-tin-di(ethylhexoate). 8.7 g. of tolylene diisocyanate containing 80 percent 2,4 and 20 percent 2,6 isomers were added to the mixture which was again stirred for about 30 seconds. A small plastic test tube about 1 cm. in diameter was filled with the resulting mixture and sealed. The tube was immediately placed in a 70° C. constant temperature bath. The time required to mix, fill the tube, seal it and place it in the bath was one minute. In five minutes the mixture had gelled to the point where it would no longer visibly flow in the inverted test tube.

EXAMPLE 24

About 1.0 g. of triethylene diamine was dissolved in about 9.0 g. of dioxan. About 100 g. of the triol of Example 14 was added to the dioxan mixture and thoroughly stirred to dissolve the triethylene diamine. 8.7 g. of tolylene diisocyanate containing 80 percent 2,4 and 20 percent 2,6 isomers were added to the mixture which was again stirred for about 30 seconds. A small plastic test tube about 1 cm. in diameter was filled with the resulting mixture and sealed. The tube was immediately placed in a 70° C. constant temperature bath. The time required to mix, fill the tube, seal it and place it in the bath was one minute. In six minutes the mixture had gelled to the point where it would no longer visibly flow in the inverted test tube.

EXAMPLE 25

A mixture of about 0.5 g. of dibutyl-tin-di(ethylhexoate) and 0.5 g. triethylene diamine was dissolved in about 9.0 g. of dioxan. About 100 g. of the triol of Example 14 was added to the dioxan mixture and thoroughly stirred to dissolve the dibutyl-tin-di(ethylhexoate) and triethylene diamine. 8.7 g. of tolylene diisocyanate containing 80 percent 2,4 and 20 percent 2,6 isomers were added to the mixture which was again stirred for about 30 seconds. A small plastic test tube about 1 cm. in diameter was filled with the resulting mixture and sealed. The tube was immediately placed in a 70° C. constant temperature bath. The time required to mix, fill the tube, seal it and place it in the bath was one minute. In three minutes the mixture had gelled to the point where it would no longer visibly flow in the inverted test tube.

Tests were made on the products of Examples 14 and 18 through 22. It was found that the reaction mixture of Experiment 14 had reacted to the point where it had a creamy appearance in 7 seconds and that it had risen to its maximum height in 70 seconds. However, the product, after solidification, pulled away from the mold, indicating shrinkage.

The reaction mixture of Example 18 assumed a creamy appearance in 7 seconds and rose to its maximum height in 70 seconds, and did not pull away from the mold.

The reaction mixture of Example 19 did not assume a creamy appearance until 11 seconds and required 120 seconds to rise to its maximum height. The product settled, indicating shrinkage.

The reaction mixture of Example 20 had a creamy appearance after 6 seconds and rose to its maximum height after about 80 seconds. However, the product pulled away from the sides of the mold and settled with splits occurring therein.

The reaction mixture of Example 21 assumed a creamy appearance in 7 seconds and rose to its maximum height in 65 seconds. The product was free from splits and did not settle or pull away from the sides of the mold.

The reaction mixture of Example 22 assumed a creamy appearance immediately, but the product settled, split, and was so weak in structure it could not be handled.

The following physical tests were obtained on Examples 14 and 18 through 21:

|  | 14 | 18 | 19 | 20 | 21 |
|---|---|---|---|---|---|
| Tensile strength, p.s.i.: |  |  |  |  |  |
| Without aging | 19.1 | 19.1 | 16.1 | 8.0 | 14.5 |
| Aged 24 hours | 3.4 | 20.6 | 17.6 | 8.4 | 16.7 |
| Elongation, percent: |  |  |  |  |  |
| Without aging | 240 | 215 | 185 | 105 | 175 |
| Aged 24 hours | 75 | 265 | 215 | 105 | 210 |
| Indentation load deflection, lbs./50 sq. in.: |  |  |  |  |  |
| Without aging at 25%/65% deflection | 48/97 | 38/80 | 47/98 | 23/72 | 44/86 |
| Aged 24 hours at 25%/65% deflection | Degraded | 7.4/38 | Degraded | 21/66 | 10/42 |

Conventional test procedures were used in obtaining the data of the foregoing table. The indentation load deflection was measured by placing a weight over an area of 50 square inches of a block of the foam and the weights in pounds required to reduce the thickness of the block by 25 percent and 65 percent of its original thickness are determined.

The foregoing data obtained by measuring the reaction rate and measuring the physical properties show that the combined catalyst containing both an organo tin compound having at least one direct alkyl or carbon to tin bond and a tertiary amine produces a product having good physical characteristics at a rate suitable for commercial production while the tertiary amine alone or the organo tin compound alone will not.

It is to be understood that any of the other organo-tin catalyst disclosed as suitable herein may be substituted for the particular ones used in the foregoing examples. Moreover, any other suitable organic compound containing groups containing hydrogen atoms reactive with —NCO groups may be substituted for the ones used in these examples. Likewise, it is possible to leave out the organo-silicon compound used or substitute other suitable stabilizers for it, but best results are obtained with a siloxane oxyalkylene block copolymer. Other tertiary amines can be substituted for those specified in the examples.

As indicated hereinbefore, in the preparation of a cellular polyurethane, best results are obtained when the catalyst mixture contemplated herein is used in combination with a siloxane oxyalkylene block copolymer of the type described hereinbefore and having the general formula

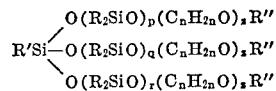

wherein R, R', R" are alkyl radicals having 1 to 4 carbon atoms; $p$, $q$ and $r$ each have a value of from 4 to 8 and $(C_nH_{2n}O)$ is a mixed polyoxyethylene oxypropylene block containing from 15 to 19 oxyethylene units and from 11 to 15 oxypropylene units with $z$ equal to from about 26 to about 34 or similar stabilizer. A process for making a cellular polyurethane which combines this stabilizer with the novel catalyst mixture described herein is contemplated by the invention as a preferred embodiment. Organo-silicon compounds represented by the formula and a method for making them are disclosed in U.S. Pat. 2,834,748.

Although all compounds represented by the general formula given hereinbefore are broadly contemplated, best results have been obtained with a compound having the formula

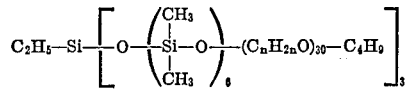

wherein $(C_nH_{2n}O)$ is a mixed polyoxyethylene and oxypropylene block containing about 17 oxyethylene units and about 13 oxypropylene units. Hence, it is preferred to use this compound in conjunction with the novel catalyst set forth herein to prepare a cellular polyurethane. It has been found that the combination of catalyst and silicone provided by this invention can be used to best advantage in preparing a cellular polyurethane from a polyalkylene ether glycol having a secondary hydroxyl group, such as, for example, a polypropylene ether glycol.

Although the invention is especially advantageous because it makes it possible to prepare a cellular polyurethane from a polyalkylene ether alcohol having secondary hydroxyl groups by a process wherein all of the components are mixed together at one time, the catalyst can be used for making a cellular polyurethane from other known organic compounds containing groups containing hydrogen atoms reactive with an —NCO group and thus a process using any such compound is contemplated. Moreover, the catalyst can be used in a two-step process in which a prepolymer is prepared in a first step by reacting an excess of an organic polyisocyanate with the organic compound containing groups containing hydrogen atoms reactive with an —NCO group under substantially anhydrous conditions and this prepolymer is then reacted in a second step with water in the presence of the catalyst provided by this invention to form a cellular product. The tertiary amine permits one to exercise control over the rate of formation of carbon dioxide when water is used as a blowing agent and thus insures the proper porosity in the product. Other suitable blowing agents which may be used in combination with water or alone include the halogenated hydrocarbons such as dichlorodifluoromethane or similar material which becomes gaseous at the foaming temperatures. When water is used alone from about 0.5 parts to about 5.0 parts water per 100 parts organic compound containing hydrogen atoms determinable by the Zerewitinoff method or prepolymer should preferably be used. If a blowing agent such as dichlorofluoromethane alone is used, from about 0.5 part to about 35.0 parts per 100 parts of organic compound containing hydrogen atoms determinable by the Zerewitinoff method preferably should be used.

The density of the cellular product will vary with the amount of water used. Preferably, from about 1.5 to about 5 parts water per 100 parts polyol is used. An excess of polyisocyanate over that required to react with all the reactive hydrogen atoms of the polyol is used. Preferably, at least 10 percent excess over the equivalent amount of polyisocyanate is used. In other words, there should be a 10 percent excess mols of —NCO groups over the sum of the mols of —OH groups and twice the mols of water present in the reaction mixture.

Preferably the foaming reaction is carried out at a temperature somewhere between room temperature of about 20° C. and about 100° C. The blowing can be achieved by a combination of an added inert gas and gas produced by reaction of water with a polyisocyanate.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process of reacting an organic polyisocyanate with a polyalkylene ether polyol in the presence of a catalytic amount of a catalyst mixture comprising a tertiary amine catalyst and a dialkyl tin salt of a carboxylic acid having one to eighteen carbon atoms.

2. The process of Claim 1 wherein said dialkyl tin salt of a carboxylic acid is dibutyl tin di-2-ethyl hexoate.

3. The process of Claim 1 wherein said tertiary amine is triethylene diamine.

4. The process of Claim 1 wherein said catalyst mixture comprises from about 0.01 to about 3 parts by weight of said dialkyl tin salt of a carboxylic acid and from about 0.1 to about 3 parts by weight of said tertiary amine catalyst.

5. The process of Claim 1 wherein the reaction is carried out in the presence of a blowing agent to make a polyurethane foam.

6. The process of Claim 1 wherein the reaction is carried out in the presence of a blowing agent comprising water and the reaction mixture contains a siloxane-oxyalkylene block copolymer stabilizer having the formula

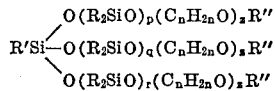

wherein R, R' and R'' are alkyl radicals having 1 to 4 carbon atoms; $p$, $q$, and $r$ each have a value of from 4 to 8 and $(C_nH_{2n}O)$ is a mixed polyoxyethylene-oxypropylene block containing from 15 to 19 oxyethylene units and from 11 to 15 oxypropylene units with $z$ equal to from about 26 to about 34, to make a polyurethane foam.

7. The process of Claim 1 wherein the reaction is carried out in the presence of a fluorochlorohydrocarbon blowing agent.

8. The process of Claim 1 wherein the reaction is carried out in the presence of a blowing agent comprising water and a fluorochlorohydrocarbon and a stabilizer which has the formula

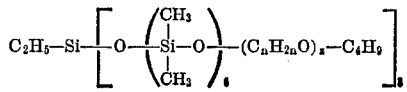

wherein $(C_nH_{2n}O)$ represents a mixed polyoxyethylene-oxypropylene block containing about 17 oxyethylene units and about 13 oxypropylene units and $z$ is about 30, to prepare a polyurethane foam.

9. The process of Claim 1 wherein said tertiary amine is N-methyl dicyclohexylamine.

10. The process of Claim 1 wherein said tertiary amine is 1-methyl-4 dimethyl amino ethyl piperazine.

11. The process of Claim 1 wherein said tertiary amine is an N-alkyl morpholine.

12. The process of Claim 1 wherein the dialkyl tin salt of a carboxylic acid is dibutyl tin di-2-ethyl hexoate and said tertiary amine is triethylene diamine.

13. The process of Claim 5 wherein the dialkyl tin salt of a carboxylic acid is dibutyl tin di-2-ethyl hexoate and the tertiary amine is triethylene diamine or 1-methyl-4-dimethyl amino ethyl piperazine.

References Cited
UNITED STATES PATENTS

| | | | |
|---|---|---|---|
| 2,957,832 | 10/1960 | Gmitter et al. | 260—2.5 AF |
| 2,949,431 | 8/1960 | Britain | 260—2.5 |
| 3,044,971 | 7/1962 | Polio | 260—2.5 |
| 3,084,177 | 4/1963 | Hostettler et al. | 260—404.5 |
| 3,194,770 | 7/1965 | Hostettler | 252—431 |
| 3,194,773 | 7/1965 | Hostettler | 260—2.5 |

HERBERT S. COCKERAM, Primary Examiner

U.S. Cl. X.R.
260—77.5 AC